United States Patent Office 3,689,413
Patented Sept. 5, 1972

3,689,413
HIGH TEMPERATURE STABLE GREASE COMPOSITIONS
Donald E. Loeffler, Ferguson, Mo., assignor to Shell Oil Company, New York, N.Y.
No Drawing. Filed May 9, 1969, Ser. No. 823,484
Int. Cl. C10m 5/20, 7/30, 7/34
U.S. Cl. 252—51.5 A    10 Claims

ABSTRACT OF THE DISCLOSURE

Grease compositions comprising an oleaginous lubricant base containing polyamide, polyurethane, or amido-urethane thickening agents have good thermal stability and high temperature characteristics.

---

This invention relates to novel grease compositions and to thickening agents incorporated therein. More particularly it relates to compositions comprising an oleaginous lubricant base thickened with novel polyamide, polyurethane or amido-urethane thickening agents.

A continuing need exists in the art for the development of grease compositions capable of providing effective lubrication at high temperatures, e.g., 300° F. to 500° F. and above. Greases of this type find application in modern automotive and aircraft equipment, particularly in jet and turbine engines which operate at high speeds and elevated temperatures.

Greases having relatively high dropping points have been produced from the metallic salts of certain fatty acids and other carboxylic acids. Greases of this type, however, are generally not oxidation-resistant at high temperatures and have a tendency to decompose, often causing corrosion and other serious problems.

More recently a number of non-metallic thickening agents have been developed based on polyureas, ureides, aminoaryl diureas, and 1,3-triazenes as described in U.S. Pats. 3,243,372, 2,832,739, 3,284,357 and 3,281,361 respectively. These thickening agents are generally prepared from aliphatic or aromatic amines and form compounds having a number of bivalent urea-type linkages, i.e., $$-NH-\overset{O}{\underset{\|}{C}}-NH-$$

A related patent, 3,346,497 discloses monoamidourea thickening agents which are prepared by introducing an acid moiety into the urea-type thickening agents of the prior art. Although urea-thickening greases in general have proved effective in high temperature applications, the ever-increasing performance requirements placed on such lubricants has created a continuing need for the development of new types of thickening agents capable of meeting industry's demands.

It has now been found that grease compositions possessing excellent high temperature characteristics can be prepared by incorporating in an oleaginous lubricant base, a minor amount of a novel class of polyamide, polyurethane or amido-urethane thickening agents.

The thickening agents incorporated into the grease compositions of the invention can be represented by the general structural formula $$R_1—A_1—R_2—A_2—R_3—A_3—R_2—A_1—R_1$$

wherein $R_1$ is an alkyl radical having from 2 to 30 carbon atoms, $R_2$ and $R_3$ are hydrocarbylene radicals having from 2 to 24 carbon atoms, said radicals being derived from a member of the group consisting of aromatic diisocyanates, dibasic acids, dibasic acid anhydrides, difunctional alcohols and monohydroxy-monocarboxylic acids, and $A_1$, $A_2$ and $A_3$ are bivalent linking radicals selected from the group consisting of (1)

and

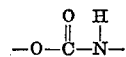

The thickening agents are generally prepared in two steps by one of two methods. According to Method I a monofunctional alcohol or acid is reacted with a difunctional isocyanate. The product of this reaction is subsequently reacted with a difunctional acid or alcohol or a hydroxycarboxylic acid. The organic thickening agents thus formed have a total of four bivalent amido or urethane linkages and can be divided into the following subclasses: (1) Tetraamides, (2) tetraurethanes, (3) diamido-diurethanes, (4) triamido-urethanes, and (5) amido-triurethanes.

The tetraamide thickening agents alternatively can be prepared by reacting a monofunctional amine with a dibasic acid anhydride, the product of which is further reacted with a difunctional isocyanate. This method is hereinafter referred to as Method II and the tetraamides thus formed are referred to as subclass (6).

The following equations exemplify the reactions involved in the preparation of the novel thickening agents employed in the compositions of the invention.

Method I

Subclass (1) Tetraamides (a)
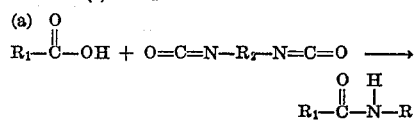

(b)
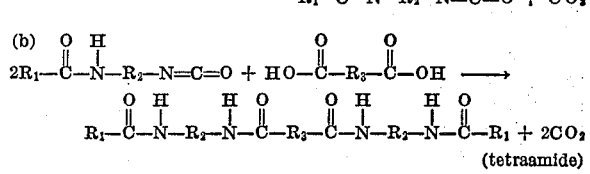
(tetraamide)

Subclass (2) Tetraurethanes (c)
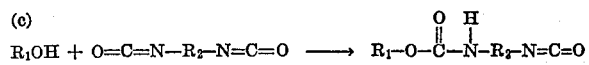

(d)
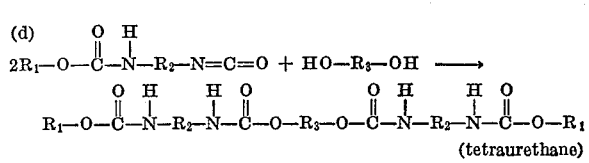
(tetraurethane)

Subclass (3) Diamido-diurethane (e)
Two moles of the product of Equation a + HO—R₃—OH ⟶
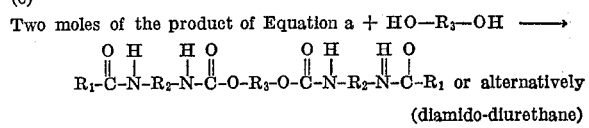
or alternatively
(diamido-diurethane)

(f)
Two moles of the product of Equation c + HO—C—R₃—C—OH ⟶
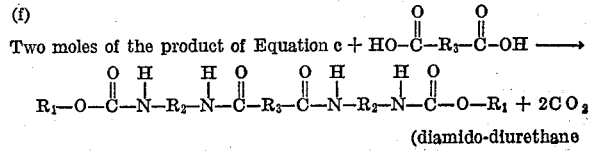
(diamido-diurethane Subclass (4) Triamido-urethane (g)

Two moles of the product of Equation a + HO—R$_3$—$\overset{O}{\overset{\|}{C}}$—OH ⟶

$R_1$—$\overset{O}{\overset{\|}{C}}$—$\overset{H}{\overset{|}{N}}$—$R_2$—$\overset{H}{\overset{|}{N}}$—$\overset{O}{\overset{\|}{C}}$—O—$R_3$—$\overset{O}{\overset{\|}{C}}$—$\overset{H}{\overset{|}{N}}$—$R_2$—$\overset{H}{\overset{|}{N}}$—$\overset{O}{\overset{\|}{C}}$—$R_1$ + CO$_2$ (triamido-urethane)

Subclass (5) Amido-triurethane (h)

Two moles of the product of Equation c + HO—R$_3$—$\overset{O}{\overset{\|}{C}}$—OH ⟶

$R_1$—O—$\overset{O}{\overset{\|}{C}}$—$\overset{H}{\overset{|}{N}}$—$R_2$—$\overset{H}{\overset{|}{N}}$—$\overset{O}{\overset{\|}{C}}$—O—$R_3$—$\overset{O}{\overset{\|}{C}}$—$\overset{H}{\overset{|}{N}}$—$R_2$—$\overset{H}{\overset{|}{N}}$—$\overset{O}{\overset{\|}{C}}$—O—$R_1$ + CO$_2$ (amidio-triurethanes)

Method II

Subclass (6) Tetraamides

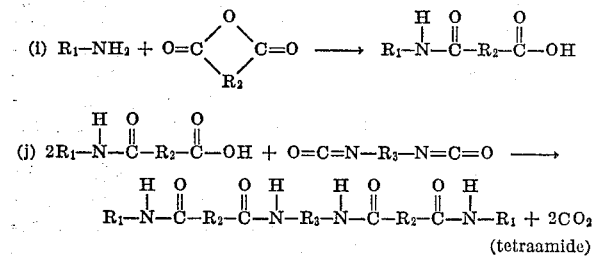

(i) $R_1$—NH$_2$ + O=C$\underset{R_2}{\overset{\diagup O \diagdown}{\phantom{X}}}$C=O ⟶ $R_1$—$\overset{H}{\overset{|}{N}}$—$\overset{O}{\overset{\|}{C}}$—$R_2$—$\overset{O}{\overset{\|}{C}}$—OH (j) 2$R_1$—$\overset{H}{\overset{|}{N}}$—$\overset{O}{\overset{\|}{C}}$—$R_2$—$\overset{O}{\overset{\|}{C}}$—OH + O=C=N—$R_3$—N=C=O ⟶

$R_1$—$\overset{H}{\overset{|}{N}}$—$\overset{O}{\overset{\|}{C}}$—$R_2$—$\overset{O}{\overset{\|}{C}}$—$\overset{H}{\overset{|}{N}}$—$R_3$—$\overset{H}{\overset{|}{N}}$—$\overset{O}{\overset{\|}{C}}$—$R_2$—$\overset{O}{\overset{\|}{C}}$—$\overset{H}{\overset{|}{N}}$—$R_1$ + 2CO$_2$ (tetraamide)

When Method I is employed to prepare the tetraamide, tetraurethane, or amido-urethane thickening agents, the $R_1$ of the aforementioned formulas would be derived from an aliphatic carboxylic acid or alcohol, while $R_2$ is derived from an aromatic diisocyanate, and $R_3$ is derived from a dibasic alcohol or acid or a hydroxycarboxylic acid. Alternatively, if Method II is used to prepare the tetraamide thickening agents, then $R_1$ would be derived from an aliphatic amine, $R_2$ from a dibasic acid anhydride and $R_3$ from the aromatic diisocyanate reactant.

During the preparation of the inventive thickeners in accordance with Method I, it is possible that minor proportions of other materials will be formed; for example diamido or diurethane compounds could result from two moles of the monofunctional acid or alcohol reacting with the diisocyanate, or longer polymeric materials could be formed from the reaction of the difunctional acid or alcohol with the diisocyanate. These side reactions are believed to occur to a lesser degree or not at all when Method II is employed.

Suitable monocarboxylic acid reactants include aliphatic acids having from 2 to 30, preferably 9 to 24, carbon atoms. Examples of such acids include pelargonic, lauric, tridecanoic, myristic, pentadecanoic, palmitic, margaric, stearic arachidic, behenic, tetracosanic and the like.

Monfunctional alcohols which can be used in the preparation of the urethane based thickeners include aliphatic alcohols having from 2 to 30, preferably 9 to 24, carbon atoms. Examples of such alcohols include nonyl, lauryl tetradecyl, hexadecyl, octadecyl, eicosyl, docosyl, etc.

The diisocyanate reactants employed in accordance with the invention are preferably aromatic diisocyanates having one or more aromatic nucleii and having from about 6 to about 16 carbon atoms. These include biphenylene diisocyanates, monophenylene diisocyanates and napthylene diisocyanates. Particularly suitable diisocyanates are 3,3'-dimethyl biphenyl 4,4'-diisocyanate, diphenylmethane 4,4'-diisocyanate, 3,3'-dimethyl diphenylmethane 4,4'-diisocyanate, mixtures of 2,4- and 2,6-tolylene diisocyanates, and 1,5-naphthalene diisocyanate.

Dibasic acids which can be used in accordance with the invention include aliphatic dicarboxylic acids such as oxalic, malonic, succinic, glutaric, adipic, or azelaic acid, and also aromatic dicarboxylic acids such as phthalic, iso- phthalic, or terephthalic acid and the like. Generally these acids have from 2 to about 16 carbon atoms.

Suitable dibasic alcohols include preferably those having from 2 to about 24 carbon atoms, particularly aliphatic difunctional alcohols such as 1,3-propanediol, 1,5-pentanediol, 1,10-decanediol, ethylene glycol and, cyclohexane-1,4-dimethanol. Aromatic dihydroxy compounds such as biphenol, 4,4'-isopropylidene diphenol are also suitable. Monohydroxymonocarboxylic acids suitable for preparing the triurethane-amido and triamidourethane thickeners of the invention include various aliphatic and aromatic compounds having from 2 to 24 carbon atoms. Examples of such difunctional reactants include glycolic acid, 12-hydroxy stearic acid, p-hydroxy-benzoic acid, hydroxy-o-toluic acid, hydroxy-α-naphthonic acid and the like.

Amines which can be effectively reacted with dibasic anhydrides in accordance with Method II of the invention are primary and secondary aliphatic amines having from 2 to 30, preferably 9 to 24, carbon atoms. Examples of such amines are nonylamine, N-methyl-octylamine, N-cyclohexyl-octylamine, dodecylamine, octadecylamine, etc.

Suitable dibasic anhydrides are those having 2 to about 16 carbon atoms. Examples of such anhydrides are those derived from malonic, succinic, glutaric, adipic, pimelic, azelaic, maleic and phthalic acids.

The oleaginous lubricant base which can be thickened with the polyamide, polyurethane, or amido-urethane thickening agents of the invention include mineral lubricating oils, synthetic hydrocarbon lubricating oils and synthetic oils. Mineral lubricating oils include those derived from napthenic base, paraffinic base, or mixed based crudes having a viscosity in the range from 50 SUS at 100° F. to about 300 SUS at 210° F. Synthetic hydrocarbon lubricating oils include those derived from coal products and other sources. Preferred base stocks of this type are hydrogenated polyolefins prepared by the oligomerization of alpha-olefins. Suitable synthetic oils include polyalkene glycols, polymers of silicone, polyethers, alkene oxide polymers, phosphate esters, dicarboxylic acid esters and pentaerythritol esters. Examples of dicarboxylic acid type esters include those prepared by esterifying such dicarboxylic acids as adipic, azelaic, suberic, sebacic, maleic, fumaric, etc., with alcohols such as butyl, hexyl, isodecyl, 2-ethyl hexyl and the like. Examples of such esters oils include dibutyl adipate, di-2-ethylhexyl sebacate, dihexyl adipate, di-2-ethylhexyl azelate and diisodecyl azelate. Mineral lubricating oils and dicarboxylic acid esters such as di-2-ethylhexyl azelate are particularly advantageous lubricant bases for the grease compositions of the invention.

The thickeners described in this specification are employed in amounts sufficient to thicken the lubricant base oils to grease consistency. The amount of thickener added to the compositions of the invention can vary from 5% to about 50% by composition weight, and more preferably from 10% to about 35% by weight.

In addition to the thickeners of the invention, the grease compositions can also contain anti-corrosion additives such as disodium sebacate, glycerol monooleate, sodium sulfonates, sodium nitrite, amino- and benzotriazoles, and isostearamides or imidazolines of tetraethylenepentamine; oxidation inhibitors such as diarylamines, e.g., phenyl-alpha-naphthylamine, phenothiazine, e.g., N-benzyl-3,7-dioctyl phenothiazine, metal dialkyldithiocarbamates, and any other additives recognized in the art to perform a particular function or functions.

The grease compositions of the invention may be produced by preparing the organic thickener separately and admixing it with the lubricant base, or the thickener may be formed in situ, i.e., in the base oil which is subsequently cooled and milled to grease consistency.

The following examples illustrate the methods of preparation of the various tetraamide, tetraurethane, and amido-urethane thickened greases of the invention.

EXAMPLE I

Preparation of tetraamide-thickened grease employing Method I 23 g. (0.081 mole) of stearic acid were dissolved in 30 g. of mineral oil. (The mineral oil employed in Examples I–V was a high viscosity index mineral oil having a viscosity of 500 SUS at 100° F.) This mixture was then added to a second mixture of 22.2 g. (0.030 mole) of 3,3'-dimethyl diphenylmethane 4,4'-diisocyanate plus 2 g. triethylamine (as a catalyst) in 60 g. mineral oil, and the reaction completed by heating to 300° F. To this was added a mixture of 6.8 (0.041 mole) of terephthalic acid in 60 g. of mineral oil. After heating to 350° F., 1 g. of phenyl-alpha-napthylamine antioxidant was added and the heating continued to 400° F. After cooling, the resulting paste was milled, baked for 3 hours at 400° F. and remilled.

EXAMPLE II

Preparation of tetraurethane-thickened grease 20.5 g. (0.110 mole) of lauryl alcohol were dissolved in 30 g. of mineral oil. This was added to a stirred mixture of 29.0 g. (0.110 mole) of 3,3'-dimethyl biphenyl 4,4'-diisocyanate plus 2 g. of methyl ethyl ketone in 60 g. of mineral oil, and the reaction completed by heating to 300° F. To this reaction mixture was added a mixture of 4.2 g. (0.055 mole) of 1,3-propanediol in 60 g. of mineral oil. After heating to 350° F., 1 g. of phenyl-alpha-napthylamine antioxidant was added and the heating continued to 400° F. After cooling, the resulting paste was milled, baked for 3 hours at 400° F. and remilled.

EXAMPLE III

Preparation of diamido-diurethane-thickened grease 27.5 g. (0.097 mole) of stearic acid were dissolved in 35 g. of mineral oil. To this was added a stirred mixture of 27.0 g. (0.094 mole) of 3,3'-dimethyl diphenylmethane 4,4'-diisocyanate plus 2 g. triethylamine (as a catalyst) in 70 g. of mineral oil, and the reaction completed by heating to 300° F. To this was added a mixture of 3.7 g. (0.049 mole) of 1,3-propanediol in 70 g. of mineral oil. After heating to 350° C., 2 g. of phenyl-alpha-naphthylamine antioxidant was added and heating continued to 400° F. After cooling the composition was baked and milled as described in Example I.

EXAMPLE IV

Preparation of triamino-urethane-thickened grease 27.5 g. (0.097 mole) of stearic acid were dissolved in 30 g. of mineral oil. To this was added a stirred mixture of 17.2 g. (0.099 mole) of mixed 2,4- and 2,6-isomers of tolylene diisocyanate plus 2 g. triethylamine (as a catalyst) in 60 g. mineral oil, and the reaction completed by heating to 300° F. To this was added a mixture of 6.8 g. (0.049 mole) of p-hydroxybenzoic acid in 60 g. of mineral oil. After heating to 350° C., 1 g. of phenyl-alpha-naphthylamine antioxidant was added and the product was baked and milled as described in Example I.

EXAMPLE V

Preparation of amido-triurethane-thickened grease 27.0 g. (0.10 mole) of octadecyl alcohol were dissolved in 50 g. of mineral oil. To this was added a stirred mixture of 26.4 g. (0.10 mole) of 3,3'-dimethyl biphenyl 4,4'-diisocyanate plus 1 g. of methyl ethyl ketone in 60 g. of mineral oil, and the reaction completed by heating to 300° F. To this was added a mixture of 6.9 g. (0.05 mole) of p-hydroxybenzoic acid in 50 g. of mineral oil. After heating to 350° C., 1 g. of phenyl-alpha-naphthylamine antioxidant was added in 115 g. of mineral oil and the product baked and milled as described in Example I.

EXAMPLE VI

Preparation of tetraamide-thickened grease employing Method II 32.4 g. (0.12 mole) of octadecylamine were melted and dissolved in 50 g. of mineral oil which contained 1 g. of triethylamine (as a catalyst). To this mixture was added a mixture of 12.0 g. (0.12 mole) of succinic anhydride in 40 g. of mineral oil, and the reaction completed by heating to 250° F. for five minutes. To the reaction mixture, after cooling, was added a mixture 15.8 g. (0.06 mole) of 3,3'-dimethyl biphenyl 4,4'-diisocyanate in 50 g. of mineral oil which contained an additional 1 g. of triethylamine. The resulting mixture was heated to 300° F. after which 2.1 g. of phenyl-alpha-naphthylamine antioxidant in 60 g. of oil were added and the heating continued to 350° F. The product was cooled and milled through a 3 roll mill.

EXAMPLE VII

To demonstrate the surprising effectiveness of the thickeners of the invention, a number of compositions were prepared and were subjected to ASTM penetration and dropping point tests. The results of these tests are shown in Table I. The columns designated $R_1$, $R_2$ and $R_3$ in the table identify the reactants from which the $R_1$, $R_2$ and $R_3$ radicals of the structural formula were derived.

The diisocyanates used in the preparation of the tetraamide, tetraurethane and amido-urethane thickeners are designated as follows:

Diisocyanate A: 3,3'-dimethyl diphenylmethane 4,4'-diisocyanate
Diisocyanate B: 3,3'-dimethyl biphenyl 4,4'-diisocyanate
Diisocyanate C: 1,5-naphthalene diisocyanate
Diisocyanate D: Mixed 2,4- and 2,6-isomers of tolylene diisocyanate
Diisocyanate E: Diphenylmethane 4,4'-diisocyanate

TABLE I

| Grease composition number | Radicals derived from— | | | Base oil | Amount of thickener, percent w | ASTM penetration | | ASTM dropping point, °F. | Thickener type |
|---|---|---|---|---|---|---|---|---|---|
| | $R_1$ | $R_2$ | $R_3$ | | | Worked ($P_{60}$) [1] | Unworked ($P_0$ at 300° F.) | | |
| 1 | Stearic acid | Diisocyanate A | Terephthalic acid | A | 27 | 309 | 223 | 468 | Tetraamide. |
| 2 | do | Diisocyanate B | do | A | 26 | 328 | 271 | 491 | Do. |
| 3 | Pelargonic acid | do | do | A | 26 | 324 | 385 | 540 | Do. |
| 4 | Lauryl alcohol | do | 1,3-propanediol | A | 26 | 234 | 230 | 523 | Tetraurethane. |
| 5 | do | Diisocyanate C | do | A | 27 | 260 | 317 | 506 | Do. |
| 6 | do | Diisocyanate B | do | C | 26 | 204 | 290 | 480 | Do. |
| 7 | do | do | do | B | 29 | 245 | 245 | 515 | Do. |
| 8 | Stearic acid | Diisocyanate D | 4,4-isopropylidene diphenol | A | 28 | 268 | 324 | 479 | Diamidodiurethane. |
| 9 | Octadecyl alcohol | do | Malonic acid | A | 23 | 249 | >440 | 540 | Do. |
| 10 | Stearic acid | do | p-Hydroxy benzoic acid | A | 26 | 245 | 400 | 494 | Triamido-urethane. |
| 11 | Pelargonic acid | Diisocyanate B | do | A | 26 | 309 | 359 | 580 | Do. |
| 12 | Octadecyl alcohol | do | do | A | 18 | 290 | 406 | 503 | Amidotriurethane. |
| 13 | Octadecyl amine | Phthalic anhydride | Diisocyanate C | A | 29 | 286 | 340 | 564 | Tetraamide. |
| 14 | do | Succinic anhydride | Diisocyanate E | B | 30 | 249 | 400 | 492 | Do. |

[1] At 77° F.

The base oils employed in the preparation of the compositions shown are designated as follows:

Base Oil A: Mineral lubricating oil having a viscosity of 500 SUS at 100° F.
Base Oil B: Di-2-ethylhexyl azelate
Base Oil C: Mixture of 89% by weight pentaerythritol esters of saturated fatty acids of $C_7$ average chain length and 11% by weight of a mineral lubricating oil having a viscosity of 150 SUS at 100° F.

EXAMPLE VIII

In order to deterine the high-speed lubrication characteristics of the grease compositions of the invention, a number of representative compositions were tested in accordance with the Navy high speed bearing test which is described in Federal Test Method 331.1. The ball bearing for this series of tests was operated at 10,000 r.p.m. at a temperature of 300° F. Bearing life is indicated in hours, and represents the length of time the test was conducted before a bearing failure occurred. The results of these tests are shown in Table II.

TABLE II

| Grease composition number | Thickener type | Bearing life hours to fail |
|---|---|---|
| Composition: | | |
| 1 | Tetraamide | +2,084 |
| 2 | do | 3,017 |
| 4 | Tetraurethane | 1,315 |
| 8 | Diamidodiurethane | 854 |
| 11 | Triamidourethane | 451 |
| 4 plus 0.8% PAN plus 0.5% | Phenothiazine | 1,893 |

It is clearly evident from the data presented in Tables I and II that the tetraamide, tetraurethane and amidourethane thickened greases of the invention possess very good high-temperature properties as measured by their dropping points, penetration values, and bearing life times. The dropping points of many of the compositions were on the order of 500° F. or higher, with worked penetrations ranging from 204 to 328. The extremely long bearing lives of the tetraamide and tetraurethane thickened greases is a further indication of the benefits to be derived by employing compositions such as these in heavy-duty, high temperature lubricating applications.

I claim as my invention:

1. A grease composition comprising a major amount of a lubricating oil and a minor amount, sufficient to thicken said lubricating oil to grease consistency, of a thickening agent having the formula $$R_1-A_1-R_2-A_2-R_3-A_3-R_2-A_1-R_1$$

wherein $R_1$ is an alkyl radical having from 2 to 30 carbon atoms, $R_2$ and $R_3$ are hydrocarbylene radicals having from 2 to 24 carbon atoms, said radicals being derived from a member of the group consisting of aromatic diisocyanates, dibasic acids, dibasic acid anhydrides, dibasic alcohols and monohydroxy-monocarboxylic acids, and $A_1$, $A_2$ and $A_3$ are bivalent liking radicals selected from the group consisting of (1)

and (2)
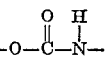

and further provided that at least one of $A_1$, $A_2$ and $A_3$ are

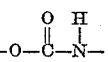

2. The composition of claim 1 wherein $R_1$ has from 9 to 24 carbon atoms and the thickening agent is present in the amount of from 5 to 50% by weight.

3. The composition of claim 2 wherein $R_2$ is derived from an aromatic diisocyanate having from 6 to 16 carbon atoms, $R_3$ is derived from a dibasic alcohol having from 2 to 24 carbon atoms and $A_1$, $A_2$ and $A_3$ are linking radical (2).

4. The composition of claim 3 wherein $A_1$ is linking radical (1) and $A_2$ and $A_3$ are linking radical (2).

5. The composition of claim 1 wherein $A_1$ is linking radical (2) and $A_2$ and $A_3$ are linking radical (1).

6. The composition of claim 2 wherein $R_2$ is derived from an aromatic diisocyanate having from 6 to 16 carbon atoms, $R_3$ is derived from a monohydroxymonocarboxylic acid having from 2 to 24 carbon atoms and $A_1$ and $A_2$ are linking radical (1) and $A_3$ is linking radical (2).

7. The composition of claim 6 wherein $A_1$ and $A_2$ are linking radical (2) and $A_3$ is linking radical (1).

8. The composition of claim 2 wherein the thickening agent is present in the amount of from 10 to 35% by weight and the lubricating oil is a mineral lubricating oil.

9. The composition of claim 8 wherein $R_2$ is derived from an aromatic diisocyanate having from 6 to 16 carbon atoms, $R_3$ is derived from a dibasic alcohol having from 2 to 24 carbon atoms and $A_1$, $A_2$ and $A_3$ are linking radical (2).

10. The composition of claim 8 wherein $R_1$ is a lauryl group, $R_2$ is derived from 3,3'-dimethyl biphenyl 4,4'-diisocyanate, $R_3$ is derived from 1,3-propanediol and $A_1$, $A_2$ and $A_3$ are linking radical (2).

References Cited
UNITED STATES PATENTS

| 2,710,839 | 6/1955 | Swakon et al. | 252—51.5 |
| 2,710,840 | 6/1955 | Swakon et al. | 252—51.5 |
| 2,710,841 | 6/1955 | Swakon et al. | 252—51.5 |
| 2,832,739 | 4/1958 | Swakon | 252—51.5 |
| 3,243,372 | 3/1966 | Dreher et al. | 252—51.5 |
| 3,281,361 | 10/1966 | Koundakjian | 252—51.5 |
| 3,284,357 | 11/1966 | Koundakjian | 252—51.5 |
| 3,346,497 | 10/1967 | Dreher et al. | 252—51.5 |

DANIEL E. WYMAN, Primary Examiner
I. VAUGHN, Assistant Examiner